F. M. REYNOLDS.
JACK AND WHEEL SUPPORT.
APPLICATION FILED MAY 5, 1910.
967,675.
Patented Aug. 16, 1910.
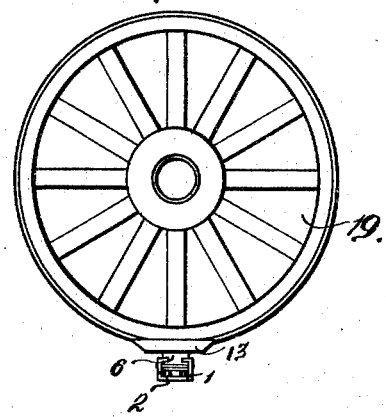
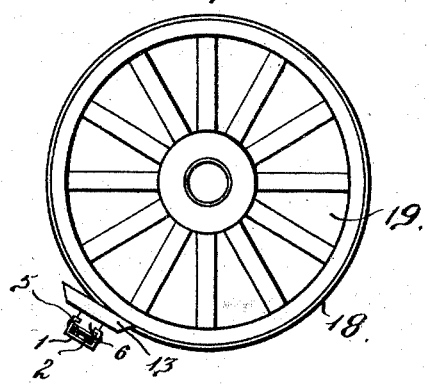
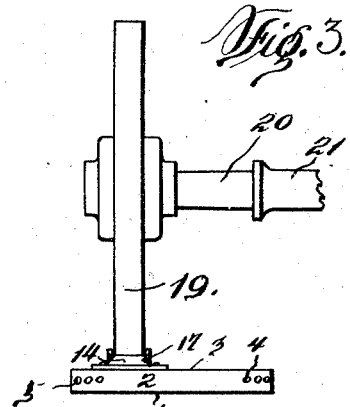
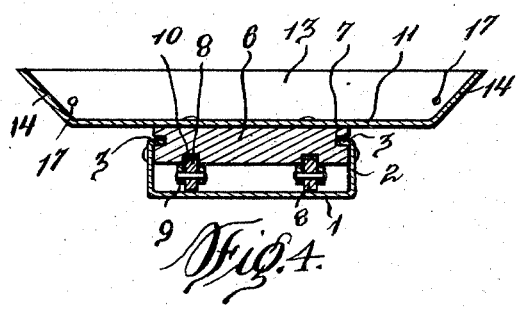
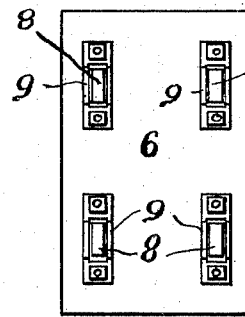
WITNESSES
INVENTOR
F. M. REYNOLDS
By
Attorneys

UNITED STATES PATENT OFFICE.

FRANCIS M. REYNOLDS, OF KITTANNING, PENNSYLVANIA.

JACK AND WHEEL-SUPPORT.

967,675.   Specification of Letters Patent.   Patented Aug. 16, 1910.

Application filed May 5, 1910. Serial No. 559,605.

*To all whom it may concern:*

Be it known that I, FRANCIS M. REYNOLDS, a citizen of the United States of America, residing at Kittanning, in the county of Armstrong and State of Pennsylvania, have invented certain new and useful Improvements in Jacks and Carriages, of which the following is a specification, reference being had therein to the accompanying drawing.

This invention relates to a jack and carriage, and the objects of my invention are to provide a novel device that can be easily placed under a wheel for shifting the wheel upon its spindle or axle, whereby the spindle or axle can be lubricated, and to furnish a device of the above type that can be safely and positively used without danger of an accident during the lubricating of the wheels of a vehicle.

Further objects of my invention are to provide a wheel shifting device that can be used in connection with various kinds of vehicles for temporarily shifting the wheels thereof, whereby the spindles or axles can be easily and quickly lubricated, and to accomplish the above results by a device that is simple in construction, durable, easy to manipulate, and highly efficient for the purposes for which it is intended.

I attain the above objects by the novel construction, combination and arrangement of parts to be hereinafter specifically described and then claimed, and reference will now be had to the drawing forming a part of this specification, wherein there is illustrated a preferred embodiment of the invention, but it is to be understood that the structural elements thereof can be varied or changed, as to the size, shape and manner of assemblage without departing from the spirit of the invention.

In the drawing:—Figure 1 is a side elevation of a vehicle wheel elevated by the device, Fig. 2 is a similar view showing the device in position prior to the wheel being elevated, Fig. 3 is a front elevation of the device showing a wheel elevated thereby, Fig. 4 is a cross sectional view of the device, and Fig. 5 is a bottom plan of the carriage.

To put my invention into practice, I provide a run-way or track adapted to be located upon the ground, and movably mounted in the run-way or track is a carriage having a pan adapted to receive the tire or periphery of a wheel, the run-way or track being provided whereby the carriage can be moved over ground or a surface that is irregular or soft.

The run-way or track comprises a channel-shaped metallic bar 1 having the vertical walls 2 thereof bent inwardly at their upper edges to provide guide flanges 3, said flanges extending from one end of the run-way or track to the opposite end thereof. The walls 2 at the ends of the run-way or track are provided with a plurality of oppositely disposed openings 4 and adjustably mounted in these openings are two transverse rods or bolts 5, constituting means for limiting the movement of the carriage upon the run-way or track.

The wheel support comprises a body 6 having the sides thereof provided with longitudinal grooves 7 extending from one end of the wheel support to the opposite end, to receive the guide flanges 3. The body 6 is of a less length than the run-way or track and is supported within said run-way or track by a plurality of wheels or rollers 8, journaled in hangers 9, carried by the under side of the body 6, said body being cut away, as at 10 to provide clearance for the wheels or rollers 8.

Suitably secured to the body 6 of the wheel support is a longitudinally-extending pan 11 formed with the side walls 13 and end walls 14.

A device constructed in accordance with my invention is manipulated in the following manner to elevate or shift the wheel of a vehicle:—The device is placed in an inclined position under the tire or periphery 18 of a wheel 19 and then the vehicle is moved whereby the wheel will ride on to the pan 11 and assume the position shown in Fig. 1 of the drawing. The wheel is elevated with the wheel support at the inner end of the runway or track 1, and after the nut or tap has been removed from the spindle 20 of an axle 21, the wheel support can be shifted to the outer end of the run-way or track, thus exposing a portion of the spindle whereby grease or lubricant can be applied thereto. The bolt or rod 5 at the outer end of the track limits the outward movement of the wheel support, consequently the end of the axle will be held by the hub of the wheel and the vehicle body supported during the lubricating operation.

After the spindle 20 has been lubricated the wheel support can be shifted to the opposite end of the run-way or track, the nut or tap placed upon the end of the spindle and then the vehicle moved to release the jack.

It is preferable to make the jack and wheel support of metal and the pan thereof can be made of various widths to accommodate various kinds of wheels.

Having now described my invention what I claim as new, is:—

1. A jack for vehicle wheels embodying a track, a wheel support movably mounted in said track, and a pan connected to said support, substantially as, and for the purpose herein described.

2. A jack of the type described embodying a track, a wheel support movably mounted in said track, a pan carried by said support, and means for confining the movement of said support within said track.

3. A jack of the type described, embodying a track, a wheel support movably mounted upon said track, a pan carried transversely of said support, and means for retaining said support in engagement with said track.

4. A jack of the type described embodying a movable wheel support, and a pan arranged transversely of said support and adapted to support a wheel.

In testimony whereof I affix my signature in the presence of two witnesses.

FRANCIS M. REYNOLDS.

Witnesses:
BOYD S. HENRY,
BLANCHE A. DUFF.